United States Patent
Joudon et al.

(10) Patent No.: US 11,555,406 B2
(45) Date of Patent: Jan. 17, 2023

(54) TURBINE BLADE HAVING A STRUCTURAL REINFORCEMENT WITH ENHANCED ADHERENCE

(71) Applicant: Safran Aircraft Engines, Paris (FR)

(72) Inventors: Vincent Joudon, Moissy-Cramayel (FR); Franck Bernard Léon Varin, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 17/262,528

(22) PCT Filed: Jul. 24, 2019

(86) PCT No.: PCT/FR2019/051836
§ 371 (c)(1),
(2) Date: Jan. 22, 2021

(87) PCT Pub. No.: WO2020/021199
PCT Pub. Date: Jan. 30, 2020

(65) Prior Publication Data
US 2021/0293152 A1 Sep. 23, 2021

(30) Foreign Application Priority Data
Jul. 24, 2018 (FR) ...................................... 1856858

(51) Int. Cl.
*F01D 5/14* (2006.01)
*F01D 5/28* (2006.01)

(52) U.S. Cl.
CPC ............. *F01D 5/282* (2013.01); *F01D 5/147* (2013.01); *F05D 2220/36* (2013.01);
(Continued)

(58) Field of Classification Search
CPC ...... F01D 5/282; F01D 5/147; F05D 2220/36; F05D 2230/23; F05D 2240/303;
(Continued)

(56) References Cited

U.S. PATENT DOCUMENTS 4,895,491 A * 1/1990 Cross .................... F04D 29/388
29/889.7
7,789,630 B2 * 9/2010 Schilling ................. F01D 5/288
416/224
(Continued)

FOREIGN PATENT DOCUMENTS

EP 1908919 A1 4/2008
EP 2033772 A1 3/2009
(Continued)

OTHER PUBLICATIONS

International Search Report in corresponding Application No. PCT/FR2019/051836, dated Dec. 10, 2019, (2 pages).
(Continued)

*Primary Examiner* — Igor Kershteyn
*Assistant Examiner* — Theodore C Ribadeneyra
(74) *Attorney, Agent, or Firm* — Bookoff McAndrews, PLLC

(57) ABSTRACT

A turbine engine blade having an aerodynamic surface extending a first direction between a leading edge and a trailing edge and in a second direction, perpendicular to the first direction, between a root of the blade and a tip of the blade, the aerodynamic surface being made of a fiber-reinforced organic matrix composite material, and a metallic structural reinforcement bonded by an adhesive joint to the leading edge whose shape it follows and which has over its entire height a substantially V-shaped section with a base extended by two lateral flanks having a thinned profile at free ends directed toward the trailing edge, the adhesive joint being locally supplemented below the free ends of the lateral flanks by an elastomeric polymer introduced in the form of solid particles into the adhesive joint and adhered to the aerodynamic surface and/or the free ends of the lateral flanks during a polymerization phase.

6 Claims, 2 Drawing Sheets

(52) U.S. Cl.
CPC .... *F05D 2230/23* (2013.01); *F05D 2240/303* (2013.01); *F05D 2250/75* (2013.01); *F05D 2300/133* (2013.01); *F05D 2300/431* (2013.01); *F05D 2300/501* (2013.01); *F05D 2300/603* (2013.01)

(58) Field of Classification Search
CPC .......... F05D 2250/75; F05D 2300/133; F05D 2300/431; F05D 2300/501; F05D 2300/601
See application file for complete search history.

(56) References Cited

U.S. PATENT DOCUMENTS

| | | | | |
|---|---|---|---|---|
| 2008/0075601 A1* | 3/2008 | Giusti | ................... | F04D 29/388 416/229 A |
| 2009/0074586 A1* | 3/2009 | Le Hong | ................... | F01D 5/16 416/229 A |
| 2010/0054945 A1 | 3/2010 | McMillan et al. | | |
| 2010/0232974 A1 | 9/2010 | De Moura et al. | | |
| 2014/0193271 A1* | 7/2014 | Dudon | ................... | F04D 29/324 427/448 |
| 2015/0104323 A1* | 4/2015 | Franchet | ................. | F01D 5/282 416/223 R |
| 2017/0252896 A1* | 9/2017 | Gascher | ................... | B24C 1/10 |

FOREIGN PATENT DOCUMENTS

| | | |
|---|---|---|
| FR | 2921099 A1 | 3/2009 |
| FR | 2943102 A1 | 9/2010 |
| FR | 2961866 A1 | 12/2011 |

OTHER PUBLICATIONS

French Search Report in corresponding Application No. FR1856858, dated Mar. 18, 2019, (2 pages).

\* cited by examiner

TURBINE BLADE HAVING A STRUCTURAL REINFORCEMENT WITH ENHANCED ADHERENCE

CROSS-REFERENCE TO RELATED APPLICATION(S)

This patent application is a National Phase of and claims the benefit of priority to Application No. PCT/FR2019/051836, filed on Jul. 24, 2019, which claims priority to FR Application No. 1856858, filed Jul. 24, 2018.

BACKGROUND OF THE INVENTION

The field of the invention is that of turbine engines and more particularly that of fan blades made of fiber-reinforced organic matrix composite material, the leading edge of which comprises a metallic structural reinforcement, and the present invention relates more particularly to a process for attaching this metallic structural reinforcement to the composite material blade of the blade.

It should be recalled that the leading edge corresponds to the front part of an airfoil that faces the airflow and divides the airflow into a lower airflow and an upper airflow. In contrast, the trailing edge corresponds the rear part of an airfoil where the upper and lower airflows meet.

Turbine engine blades, and in particular fan blades, are subject to considerable stress, in particular mechanical stress. Also, it is known to equip fan blades made of composite material with a metallic structural reinforcement extending over all the height of the airfoil and following the shape of the leading edge, as mentioned in application EP1908919 filed on behalf of the applicant. Such a metallic structural reinforcement protects the composite material blade during an impact of a foreign body on the blower, such as for example a bird, hail or even stones during takeoff or landing.

Conventionally, the metallic structural reinforcement is a titanium alloy metal part made from a preform obtained from a simple metal bar and a succession of forging steps, as described in particular in application FR2961866 also filed on behalf of the applicant, and then bonded to the leading edge of the fan blade using an epoxy adhesive joint the properties at 23° C. of which are as follows: Young's modulus 1 GPa<E<5 GPa; stress at break $\sigma_b$>10 MPa; strain at break $\varepsilon_b$<10%.

However, these impacts correspond to mechanical loads on the blade and generate, by edge effects, stress concentrations in the adhesive located under the ends of the metallic structural reinforcement that facilitate the initiation of disbonds that will then propagate more widely under the metallic structural reinforcement. These disbonds may also continue to propagate during other impacts or under vibratory fatigue loading causing risks of delamination, fiber breakage or damage by fiber/matrix decohesion.

The damaged fan blade must then be repaired or even replaced during a maintenance operation, which has a major impact on the availability of the aircraft integrating the turbine engine in question.

SUBJECT MATTER AND SUMMARY OF THE INVENTION

In this context, the invention aims at compensating for the above-mentioned disadvantages of the current bonded structural reinforcements by proposing a turbine engine blade comprising a metallic structural reinforcement the end disbonds of which are considerably reduced when a foreign body impacts on the fan.

This aim is achieved by means of a turbine engine blade having an aerodynamic surface extending in a first direction between a leading edge and a trailing edge and in a second direction, substantially perpendicular to said first direction, between a blade root and a blade tip, said aerodynamic surface being made of a fiber-reinforced organic matrix composite material, and a metallic structural reinforcement bonded by an adhesive joint to said leading edge whose shape it follows and having over its entire height a substantially V-shaped section with a base extended by two lateral flanks having a thinned profile at free ends directed toward said trailing edge, characterized in that said adhesive joint is locally supplemented under said free ends of said lateral flanks by an elastomeric polymer introduced in the form of solid particles into said adhesive joint and adhered to said aerodynamic surface and/or said free ends of said lateral flanks during a polymerization phase.

Thus, the addition of an elastomeric polymer, by softening the adhesive bond at the ends of the reinforcement, avoids the disbonds linked to the rigid bonds present in the solutions of the prior art.

Advantageously, said elastomeric polymer has the following properties at 23° C.: Young's modulus E≈10 MPa; stress at break $\sigma_b$>10 MPa; strain at break $\varepsilon_b$>80%.

Preferably, said elastomeric polymer is present over a length comprised between 0% and 25% of a total length from each of said free ends of each of said lateral flanks.

Depending on the embodiment considered, said elastomeric polymer may be adhered to both said aerodynamic surface and said free ends of lateral flanks, replacing said adhesive joint, or may be introduced in the form of particles into said adhesive joint.

The invention also relates to any turbine engine comprising at least one such blade.

BRIEF DESCRIPTION OF THE DRAWINGS

Other features and advantages of the present invention will emerge from the description made below, with reference to the appended drawings which illustrate an example embodiment devoid of any limiting character and on which.

DETAILED DESCRIPTION OF AN EMBODIMENT

Figure 1:
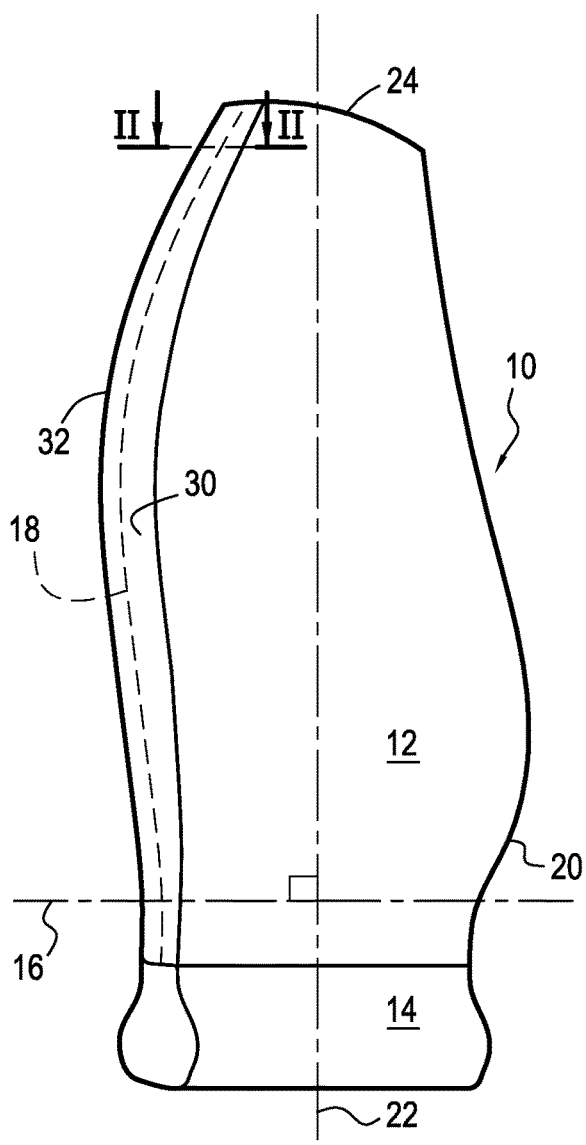
FIG. 1 represents a turbine engine fan blade in side view.

FIG. 1 is a side view of a blade, for example a fan blade of a turbine engine (not shown), having a leading edge metallic structural reinforcement according to the invention.

The blade 10 comprises an aerodynamic surface or blade 12 integral with a root 14 and extending in a first axial direction 16 between a leading edge 18 and a trailing edge 20 and in a second radial direction 22 substantially perpendicular to the first direction 16 between this root 14 and a tip of the blade 24. The lateral surfaces of the blade 12 which connect the leading edge 18 to the trailing edge 20 constitute the upper 26 and lower 28 surfaces of the blade.

Conventionally, the blade 12 is made of a fiber-reinforced organic matrix composite material. By way of example, the composite material used can be composed of an assembly of woven carbon fibers and an epoxy resin matrix, the whole being formed by molding by means of a resin injection process of the resin transfer molding (RTM) type.

The blade 10 also has a structural reinforcement 30 bonded to the leading edge 18 of the blade and extending both in the first direction 16 beyond this leading edge and in the second direction 22 between the root 14 and the tip 24 of the blade.

Figure 2:
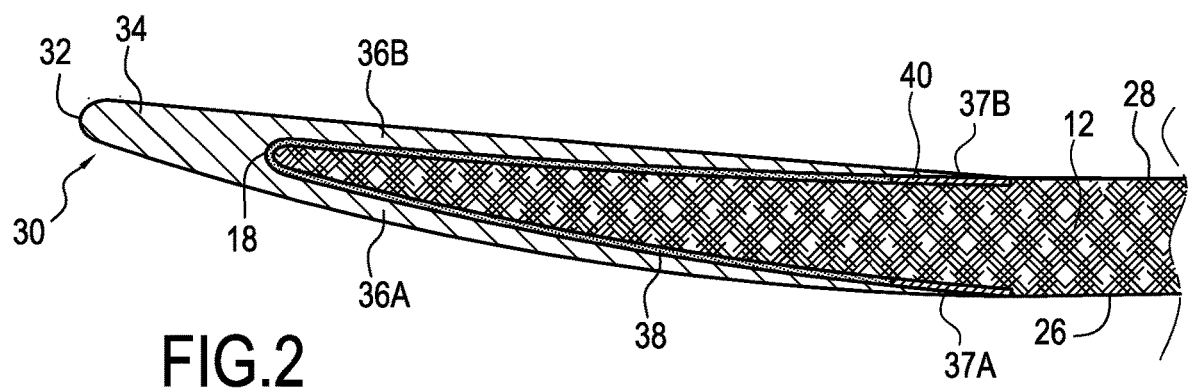
FIG. 2 illustrates a partial section of the blade of FIG. 1 showing a metallic structural reinforcement of the leading edge bonded to the composite material blade in accordance with the invention.

As shown in FIG. 2, the structural reinforcement 30 follows the shape of the leading edge 18 of the blade 12 of the blade 10 which it extends to form the leading edge of the blade 32. Conventionally, this structural reinforcement 30 is advantageously a one-piece part comprising an approximately V-shaped section having a base or nose 34 whose external profile forms the leading edge of the blade 32 and the rounded internal profile is able to follow the rounded shape of the leading edge 18 of the blade 12. This base is extended by two lateral flanks or fins 36A and 36B following the lower 26 and upper 28 surfaces of the blade and presenting a tapered or thinned profile at the free ends 37A, 37B directed toward the trailing edge of the blade. The structural reinforcement 30 is metallic and preferably based on TA6V type titanium. Indeed, this material has a high impact energy absorption capacity.

As FIG. 2 also shows, the structural reinforcement 30 is bonded to the blade 12 by means of an adhesive joint 38 of known properties recalled in the preamble of the present application, which adhesive joint is, according to the invention, locally supplemented under the free ends 37A, 37B of the fins 36A, 36B of an elastomeric polymer 40 adhered to the blade and/or to these free ends during a polymerization phase and whose properties at 23° C. are as follows: Young's modulus E≈10 MPa; stress at break $\sigma_b$>10 MPa; strain at break $\varepsilon_b$>80%. An example of such an elastomeric polymer is known as 23HP90 from the firm ITC.

This additional adhesion can be obtained at these free ends as a total replacement of the adhesive joint or in addition to the adhesive joint. In the absence of an adhesive joint, the surface of the reinforcement or that of the composite is degreased and sanded before receiving an adhesion primer. The elastomer is then adhered to the surface during its vulcanization (or polymerization) in a specific tooling known per se, for example at a temperature of 180° C. under a pressure of 3 bars and for 60 minutes. In the presence of an adhesive joint, the same polymerization process can be used to adhere all the elements (reinforcement, composite, elastomer and adhesive joint) together. It is also possible to polymerize the elastomer on the reinforcement or on the composite and then to place the reinforcement on the composite by interposing the adhesive joint and then to polymerize the assembly thus formed.

The elastomeric polymer can be present over a length comprised between 0% and 25% of the total length of the fin from its free end. The skilled person knows how to adapt it according to the criticality of the area located at a given height of the blade. This makes it possible to have an adhesive joint with mechanical properties optimized by zone according to need, like what is achieved with conventional composite materials. Indeed, since elastomeric polymers generally have a low stiffness, the intensity and singularity of the stresses induced by edge effects in the elastomeric polymer are considerably reduced compared to a conventional epoxy adhesive. In addition, elastomeric polymers have very high strains at break and stresses at break that increase with the impact speed. The addition of an elastomeric polymer at the fin tip thus ensures the dual function of i) attenuating the stresses generated in this critical zone and ii) dissipating the mechanical energy of the impact without damaging itself.

Figure 3:
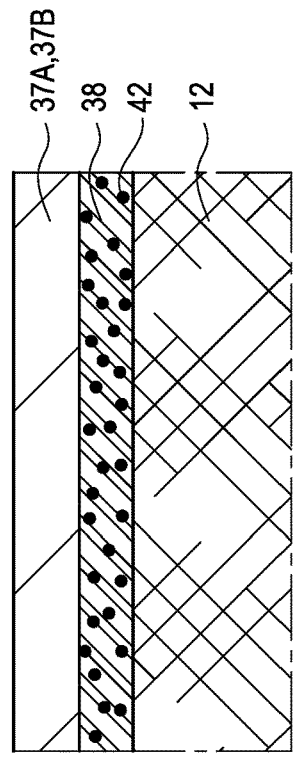
FIGS. 3, 4A, 4B, 4C and 5 show several distinct example embodiments of the assembly structure of the elastomeric polymer connecting the blade to the metallic structural reinforcement.

FIG. 3 illustrates, on a detail of the assembly structure, the elastomeric polymer 40 adhered by polymerization to the blade 12 and to the fin tips 37A, 37B and replacing at this location (i.e. locally) the adhesive joint between this blade and these fin tips.

Figure 4A:
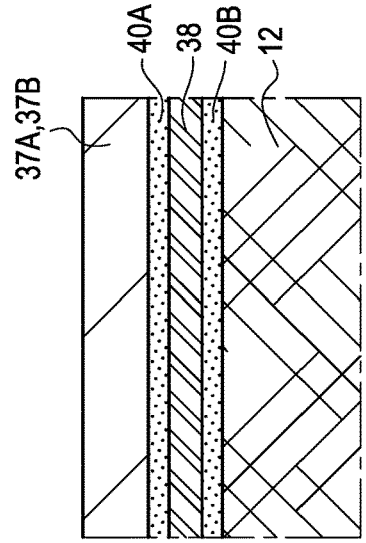
Figure 4B:
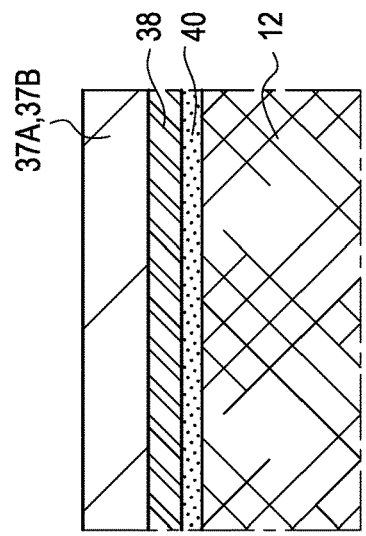
Figure 4C:
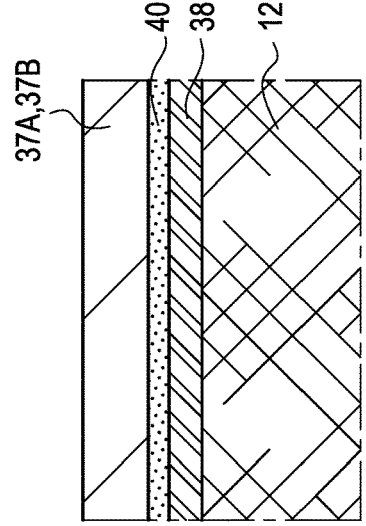

FIG. 4A illustrates, on a detail of the assembly structure, the elastomeric polymer 40 forming a homogeneous layer, applied for example by projection of molten particles on the tip of the fin 37A, 37B, before application of the adhesive joint 38 between this layer and the blade 12. In FIG. 4B, it is envisaged that this layer is applied to the blade 12 and not to the tip of the fins, and in FIG. 4C that it is applied to both the blade 12 and the tips of fins 37A, 37B, an intermediate adhesive joint 38 then ensuring the bond between these two layers of elastomeric polymer 40A, 40B.

Figure 5:
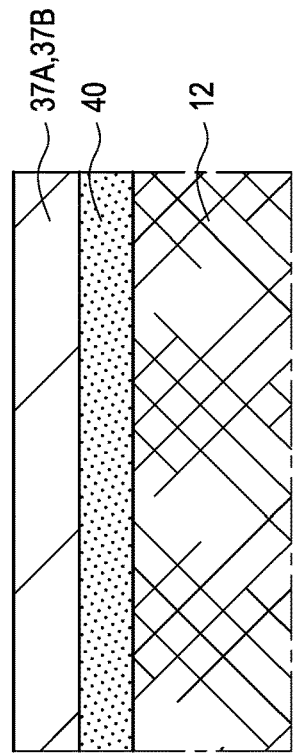

Finally, FIG. 5 illustrates, on a detail of the assembly structure, the elastomeric polymer introduced in the form of solid particles 42 in the adhesive 38. In this case, the solid particles are sprinkled onto the raw adhesive beforehand and are dispersed in the thickness of the adhesive joint during the polymerization phase which involves a decrease in viscosity and the creep of the adhesive.

If the aforementioned description has been illustrated by a turbine engine fan blade, it should be noted that the invention is also applicable to the production of a metallic structural reinforcement intended to reinforce the leading edge of any other type of turbine engine blade, whether for land vehicles or for aircraft, and in particular a helicopter turboshaft engine or an aircraft turbojet engine, but also of propellers such as the propellers of non-veined counter-rotating double fans.

The invention claimed is:

1. A turbine engine blade comprising an aerodynamic surface extending in a first direction between a leading edge and a trailing edge and in a second direction, substantially perpendicular to said first direction, between a blade root and a blade tip, said aerodynamic surface being made of a fiber-reinforced organic matrix composite material, the blade further comprising a metallic structural reinforcement bonded by an adhesive joint to said leading edge whose shape it follows and having over its entire height a substantially V-shaped section with a base extended by two lateral flanks having a thinned profile at free ends directed toward said trailing edge, wherein said adhesive joint is locally supplemented under a trailing edge tip of said free ends of said lateral flanks by an elastomeric polymer introduced in the form of solid particles into said adhesive joint and adhered to said aerodynamic surface and/or said free ends of said lateral flanks during a polymerization phase.

2. The blade as claimed in claim 1, wherein said elastomeric polymer has the following properties at 23° C.: Young's modulus E≈10 MPa; stress at break $\sigma_b$>10 MPa; strain at break $\varepsilon_b$>80%.

3. The blade as claimed in claim 1, wherein said elastomeric polymer is present over a length comprised between greater than 0% and 25% of a total length from each of said free ends of each of said lateral flanks.

4. The blade as claimed in claim 1, wherein said structural reinforcement is a titanium-based metal of the TA6V type.

5. The blade as claimed in claim 1, constituting a turbine engine fan blade.

6. A turbine engine having at least one blade as claimed in claim 5.

* * * * *